Feb. 4, 1941.　　　J. A. SWEENEY　　　2,230,366
FILING SYSTEM
Filed June 15, 1939　　　4 Sheets-Sheet 1
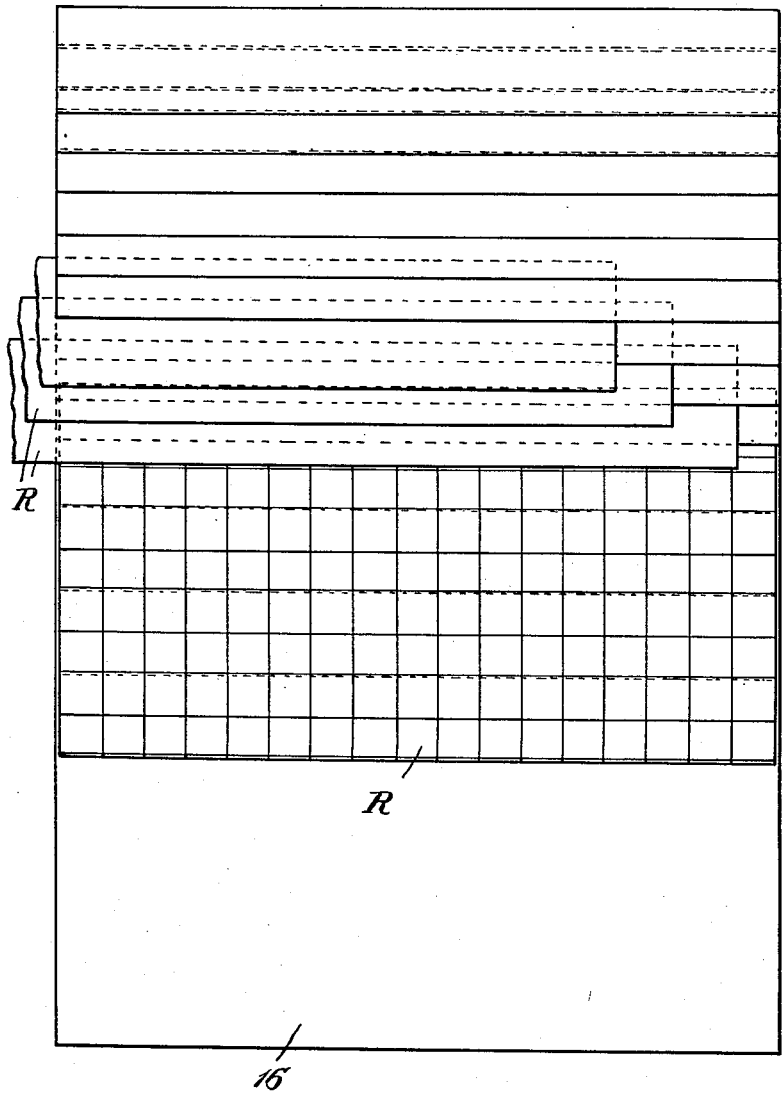
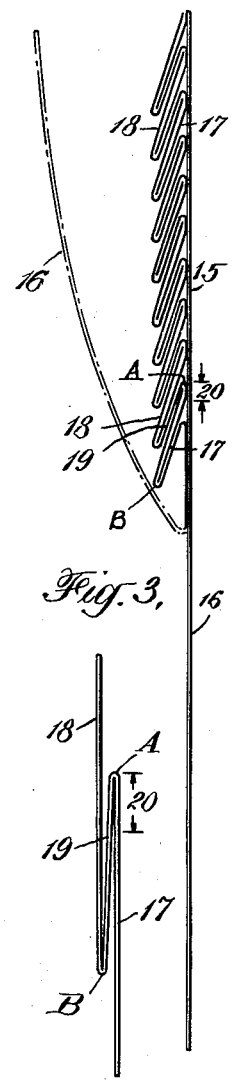
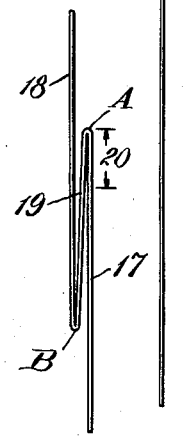
INVENTOR
Joseph A. Sweeney
BY
Marshall Hawley
ATTORNEYS Feb. 4, 1941. J. A. SWEENEY 2,230,366
FILING SYSTEM
Filed June 15, 1939 4 Sheets-Sheet 2
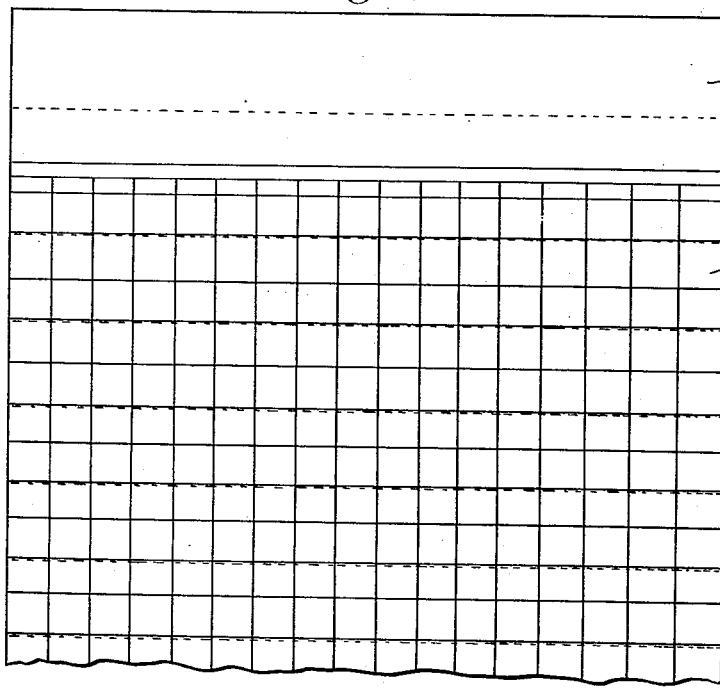
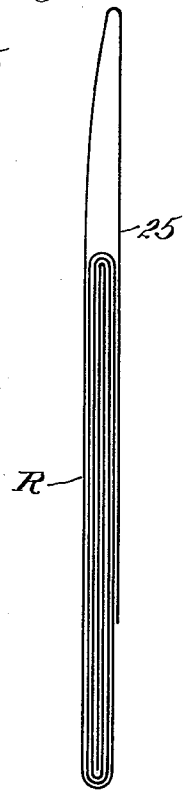
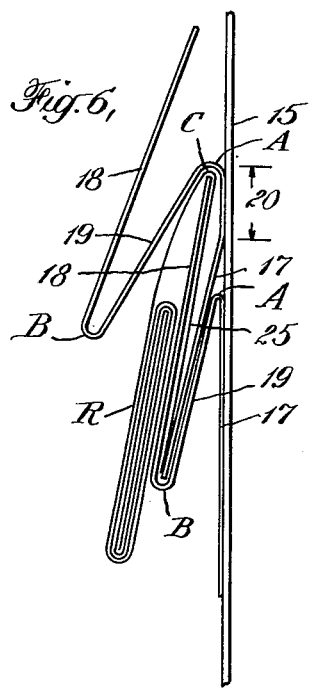
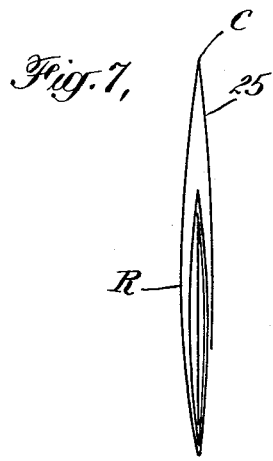
INVENTOR
Joseph A. Sweeney
BY
Marshall & Hawley
ATTORNEYS

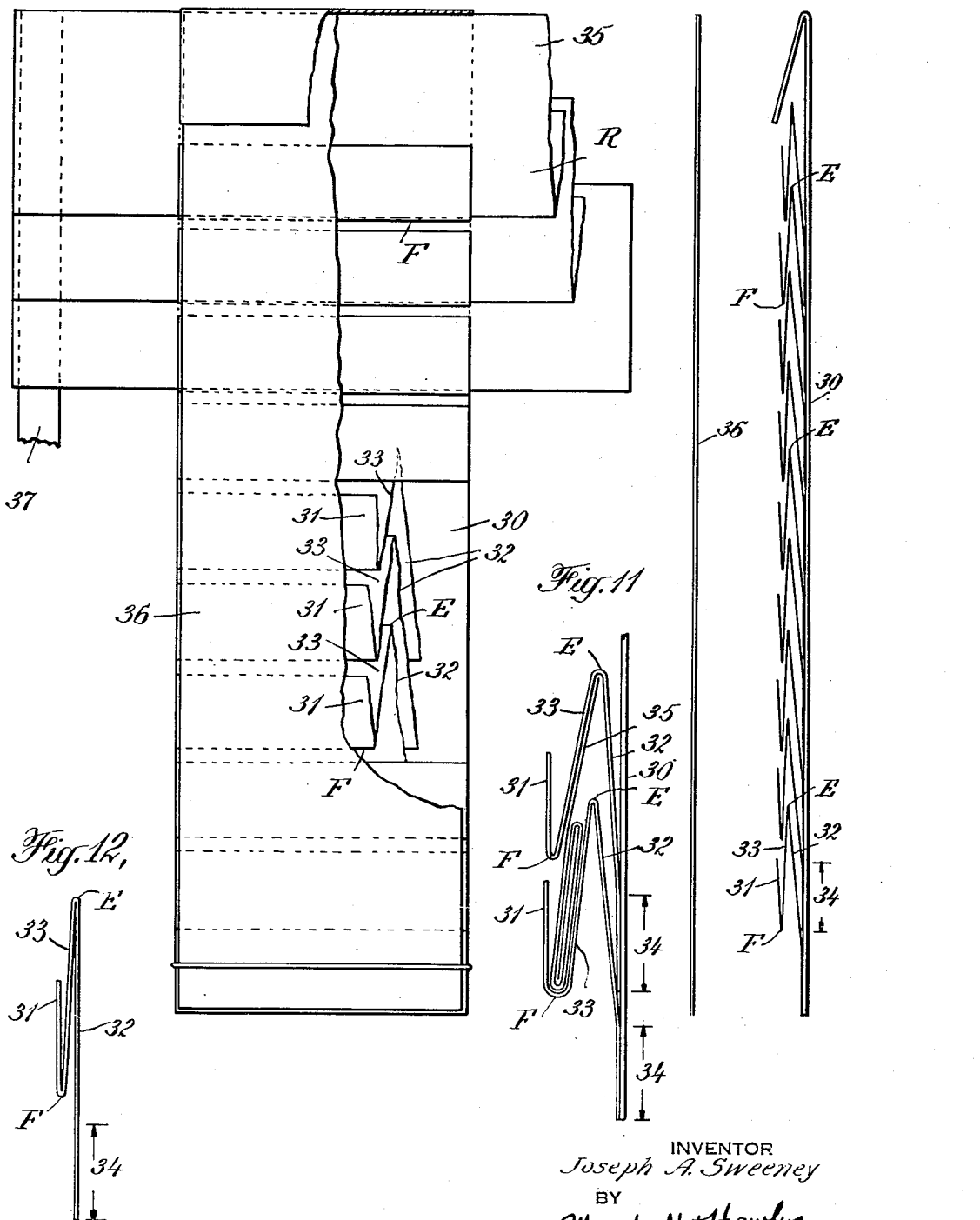

Feb. 4, 1941. J. A. SWEENEY 2,230,366
FILING SYSTEM
Filed June 15, 1939 4 Sheets-Sheet 4
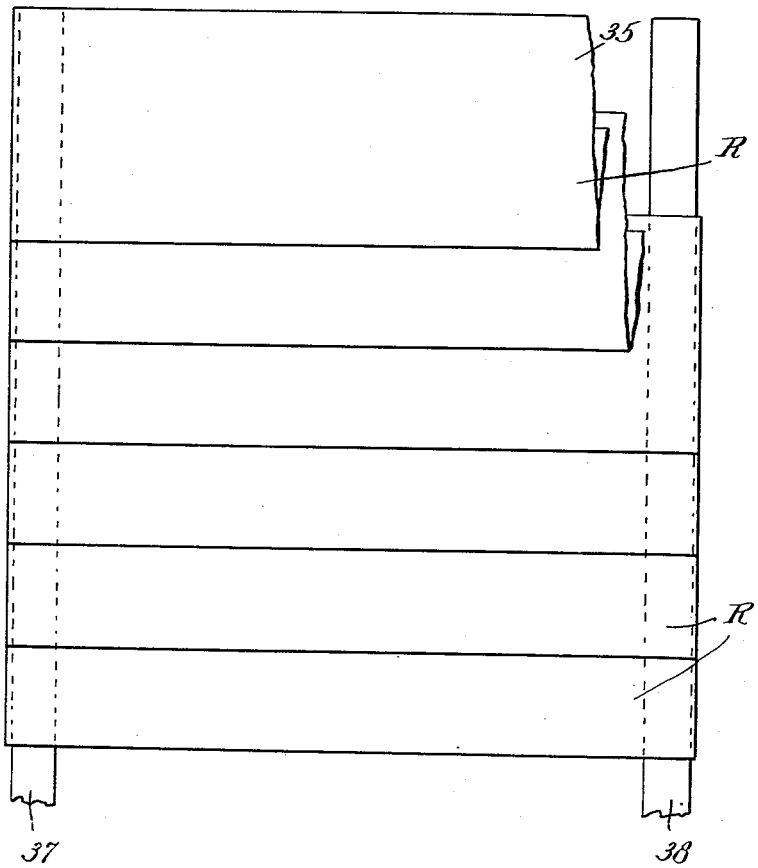
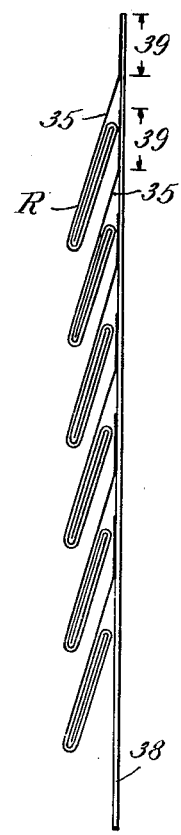
INVENTOR
Joseph A. Sweeney
BY
Marshall Hawley.
ATTORNEYS Patented Feb. 4, 1941

2,230,366

UNITED STATES PATENT OFFICE 2,230,366

FILING SYSTEM

Joseph A. Sweeney, New York, N. Y.

Application June 15, 1939, Serial No. 279,233

11 Claims. (Cl. 129—16)

This invention relates to filing systems and to apparatus or means for facilitating the entry and storing of records.

The invention is adapted for use in many departments of business, as for instance, in merchandise control, inventory records, sales comparison and control, unit control for debit and credit summarized records, records for social security and payrolls, and the entry of comparative records.

This invention has for its salient object to provide a filing system and filing apparatus that is simple, practical and inexpensive in construction and is so constructed and arranged that entries can be made quickly and the records can be easily removed when desired.

Another object of the invention is to provide a system of and apparatus for the entry and filing of records, so arranged that successive entries can be made for comparative record study without removing the record sheets from the holder.

Another object of the invention is to provide a record holding rack with holders so arranged as to support a plurality of record sheets and to lock the sheets in supported position against accidental displacement or removal.

Another object of the invention is to provide a record holding rack with holders so arranged as to support a plurality of record sheets in such a manner as to permit the ready removal thereof by a lateral movement of the record sheets.

Another object of the invention is to provide a rack for supporting and holding record sheets in such a manner that they can be easily secured together and removed for filing, for comparative study, or for any other desired purpose.

Further objects of the invention will appear from the following specification taken in connection with the drawings which form a part of this application, and in which Fig. 1 is a front elevation of a record holding rack or apparatus constructed in accordance with the invention;

Fig. 2 is an end elevation of the structure shown in Fig. 1, with the record sheet omitted;

Fig. 3 is an enlarged end view of one of the holders separated from the backing sheet or support;

Fig. 4 is a front elevation of one of the record sheets partially unfolded;

Fig. 5 is an enlarged end elevation of one of the sheets;

Fig. 6 is an enlarged end elevation of a portion of the structure shown in Fig. 1, illustrating a record sheet mounted in one of the holders;

Fig. 7 is an end elevation of one of the sheets illustrating the manner in which the sheet is folded;

Fig. 8 is a front elevation of a slightly modified form of rack in which the holders are so arranged as to support record sheets in such a manner that they can be secured together and then removed from the rack or holder by shifting the connected record sheets downwardly relative to the supporting rack;

Fig. 9 is an end elevation of a relatively stiff sheet which is used to hold the record sheets in position when they are being secured together;

Fig. 10 is an end elevation of the rack structure shown in Fig. 8;

Fig. 11 is an enlarged end elevation showing a portion of the rack illustrated in Fig. 8 and the manner in which the record sheets are mounted in the rack;

Fig. 12 is an enlarged end elevation of one of the holders of the rack shown in Figs. 8 and 10;

Fig. 13 is a front elevation of the structure shown in Fig. 8 showing the manner of securing the record sheets together prior to their removal from the rack or holder; and Fig. 14 is an end elevation of the structure shown in Fig. 13 illustrating the record sheets secured together.

The invention briefly described consists of a filing system and apparatus for filing records. The apparatus comprises a plurality of holders mounted in overlapping position on a backing sheet or support and so relatively constructed and arranged that record sheets having folded upper ends can be supported on the holders in such a manner as to prevent their being removed by downward pull or accidently removed, but, moreover, in such a manner as to permit their removal by a lateral movement of the sheets.

The record sheets are folded inwardly or backwardly on themselves so that when mounted in the holders they will expose corresponding vertical and lateral record sections in such a manner as to facilitate comparative study thereof. Furthermore, the record sheets can be unfolded step by step to permit other corresponding records to be exposed for comparative study.

In a slightly modified form of the invention, holders are provided for accurately positioning a plurality of record sheets relative to each other in such a manner as to enable the user to secure the sheets together, whereupon they can be easily removed from the rack or holder by a simple downward pull on the connected sheets. After their removal they can be handled for comparative study or used in any other desired manner.

Further details of the invention will appear from the following description.

In the embodiment of the invention illustrated in Figs. 1–7 inclusive, the apparatus comprises a backing sheet 15 of any desired relatively stiff material and having a foldable flap 16 at the bottom thereof.

A plurality of holders are secured to the backing sheet, each holder consisting of a strip of relatively stiff material, such as cardboard, which is folded into Z shape and comprises two oppositely extending ends 17 and 18 which are connected by an intermediate portion 19, the ends and the intermediate portion forming the Z-shaped holder.

Each of the holders has a portion 20 of the end 17 indicated on Fig. 3 as the portion between the arrows, secured in any suitable manner, as by adhesive, to the backing sheet 15.

The holders are mounted on the backing sheet in overlapping relation, as illustrated particularly in Figs. 2 and 6. The two bends of the holders are indicated on Fig. 3 by reference characters A and B. It will be seen from the showing in Figs. 2 and 6 that the upwardly extending end 18 of each holder is disposed within the bend A of the next upper holder and extends substantially to the fold line of the bend.

The record sheets R are prepared for use in the holder or rack by folding them in the manner illustrated particularly in Figs. 5, 6 and 7. As there shown, each sheet is folded inwardly on itself and, as shown particularly in Fig. 7, the folds are graduated in width in such a manner that the folded sheet will lie substantially flat. The upper end of each record sheet R is folded back, as shown at 25 in Fig. 7. This end may be of any desired length and need not necessarily be as long as is indicated in the drawings.

The record sheets may be ruled in any desired manner, transversely and longitudinally, as shown in Fig. 4, and they are mounted in the holders by inserting them laterally in the rack. The fold lines are shown as dotted in Fig. 4. Each holder is mounted with the end 25 being disposed behind the end 18 of one of the holders, and it will be evident that the sheet will be securely held in position since the upper bend or fold C of each sheet is held beneath the fold A of the holder above the one on which the sheet is supported.

Fig. 1 illustrates the sheets mounted in the holder and it will be evident that successive transverse sections can be exposed by successively unfolding the folded record sheets. The sheets may be used for any desired form or type of records, as for instance, for inventory records for different stores, and it will be evident that when so used a comparative study of the inventories of the various stores can be easily and quickly made.

By making the records in the manner above indicated it will be evident that the necessity for transferring and checking records will be eliminated, thus effecting a more accurate permanent record and materially reducing the time and labor required.

In the form of the invention illustrated in Figs. 8–14 inclusive, there is shown a rack particularly designed for supporting and holding record sheets in a manner to permit their being secured together and easily removed from the rack.

In this form of the invention the rack comprises a backing sheet 30 of relatively stiff material and each holder comprises a strip which is bent into Z shape and has oppositely extending ends 31 and 32 and an intermediate connecting portion 33, the folds or bends forming the Z being indicated at E and F.

It will be noted that the holder used in the form of the invention illustrated in Figs. 8–14 inclusive, and illustrated in enlarged views in Figs. 11 and 12, is slightly different from that used in the other embodiment of the invention. As shown in Fig. 12, the end 32 is much longer than the end 31 and in this form of the invention the lower end of the end 32 disposed between the arrows in Fig. 12 and designated 34 is secured to the backing sheet 30. Although the holders, as shown particularly in Figs. 10 and 11, are mounted in the backing sheet in overlapping relation, there is no such interlocking of successive holders as that obtained in the other form of the invention. Furthermore, the ends 31 of the successive holders do not overlap, but can be bent outwardly without obstruction.

The record sheets to be positioned in the rack illustrated in Figs. 8 and 10 are prepared by folding the sheets in the manner shown in Fig. 11, each sheet being folded inwardly on itself, but the free end of each sheet being permitted to extend upwardly, as shown at 35 in Fig. 11.

In mounting the prepared sheets on the holder each sheet has its folded portion positioned within the bend F of a holder and has its free end 35 extending upwardly and into the bend E of the holder disposed next above the one in which the sheet is mounted. The distance between the lower edge of the folded sheet and the upper edge of the free end 35 thereof is substantially equal to the distance between the inner surface of the fold F in which the sheet is mounted and the inner surface of the fold E of the holder disposed thereabove. Thus, an accurate positioning of the record sheets is insured.

In order to retain the holders and sheets mounted therein in position when the sheets are being secured together, a strip 36 is placed over the front of the rack or holder in engagement with the portions 31 thereof. The rack is then reversed and strips 37 and 38 are secured to the back surfaces of the overlapping portions 35 of the record sheets along the lateral edges 39 thereof. When the record sheets have been connected together or secured by the strips 37 and 38 the connected sheets can be easily and quickly removed from the rack by a downward pull after the retaining strip 36 has been removed from engagement with the ends or flaps 31. Since the portions 35 of the record sheets are connected at their ends only by strips 37 and 38 and the rack or holder is disposed at the central portions of the sheets R, the downward pull will fold or bend the flaps 31 outwardly and downwardly releasing the folded, connected record sheets R from the flaps 31.

The record sheets can then be utilized in any desired manner, as for instance, in comparative study of the records thereon and after the study has been completed and if it is desired to file the record sheets separately, the ends can be severed to remove the connecting strips 37 and 38.

It will be evident from the foregoing description that the embodiment of the invention illustrated in Figs. 8–14 inclusive, provides an accurate method of mounting, aligning and securing record sheets and that this holder or rack can be used repeatedly and effectively.

Although certain specific embodiments of the invention have been particularly shown and described, it will be understood that the invention is capable of modification and that changes in the construction and in the arrangement of the various cooperating parts may be made without departing from the spirit and scope of the invention, as expressed in the following claims.

What I claim is:

1. Filing apparatus comprising a backing sheet, a plurality of holders secured thereto in overlapping relation to each other, each holder consisting of a Z shaped strip, an inner leg only of the Z being secured to the backing sheet and extending downwardly and the other leg extending upwardly, the upwardly extending leg of each holder strip extending into the downwardly opening fold of the holder next above.

2. Filing apparatus comprising a backing sheet, a plurality of holders secured thereto in overlapping relation to each other, each holder consisting of a Z shaped strip, an inner leg only of the Z being secured to the backing sheet and extending downwardly and the other leg extending upwardly, the upwardly extending leg of each holder strip extending into the downwardly opening fold of the holder next above and substantially to the bend of said fold.

3. Filing apparatus comprising a backing sheet, a plurality of holders secured thereto in overlapping relation to each other, each holder consisting of a Z shaped strip, an inner leg only of the Z being secured to the backing and extending downwardly and the other leg extending upwardly, the upwardly extending leg being locked beneath the downwardly extending, overlapping portion of the holder next above.

4. Filing apparatus comprising a backing sheet, a plurality of holders secured thereto in overlapping relation to each other, each holder consisting of a Z shaped strip, the upper portion of an inner leg only of the Z being secured to the backing sheet and said leg extending downwardly and the other leg extending upwardly, the upwardly extending leg of each holder strip extending into the downwardly opening fold of the holder next above.

5. Filing apparatus comprising a backing sheet, and a plurality of holders secured thereto in overlapping relation, each holder consisting of a Z shaped strip having an inner leg only secured along its upper leg portion only to the backing sheet and the outer leg extending upwardly and disposed within a downwardly opening fold of the next upper holder.

6. In combination, filing apparatus comprising a backing sheet, a plurality of holders secured thereto in overlapping relation, each holder consisting of a Z shaped strip having an inner leg only secured to the backing sheet and the outer leg extending upwardly and disposed within a downwardly opening fold of the next upper holder, and a plurality of record sheets mounted in said holders, each sheet having a folded upper end disposed over the upper end of the outer leg of one of the holders and held in position by the said downwardly opening fold of the next upper holder, said sheets being laterally movable in the holders for removal therefrom.

7. Filing apparatus comprising a backing sheet and a plurality of holders secured thereto in overlapping relation, each holder consisting of a Z shaped strip, an inner leg only of the strip being secured directly to the backing sheet, the lateral ends of the strip being open and unobstructed, each holder strip having a portion extending upwardly into a downwardly opening fold in the holder disposed next above said holder.

8. In combination, filing apparatus comprising a backing sheet, a plurality of holders secured thereto in overlapping relation, each holder consisting of a Z shaped strip, one end or leg of the strip being secured to the backing sheet, each holder strip having a portion extending upwardly into a downwardly opening fold in the holder disposed next above said holder strip, and a plurality of folded record sheets mounted in said holders and having the distance from the upper edge of the record sheet to the lower fold in the sheet substantially equal to the distance between the lower fold of the Z shaped holder and the upper fold of the next upper holder.

9. In combination, filing apparatus comprising a backing sheet, a plurality of holders secured thereto in overlapping relation, each holder consisting of a Z shaped strip, one end or leg of the strip being secured to the backing sheet, each holder strip having a portion extending upwardly into a downwardly opening fold in the holder disposed next above said holder strip, and a plurality of folded record sheets mounted in said holders and having the distance from the upper edge of the record sheet to the lower fold in the sheet substantially equal to the distance between the lower fold of the Z shaped holder and the upper fold of the next upper holder, the record sheets extending laterally beyond the ends of the holders.

10. In combination, filing apparatus comprising a backing sheet, a plurality of holders secured thereto in overlapping relation, each holder consisting of a Z shaped strip, one end or leg of the strip being secured to the backing sheet, each holder strip having a portion extending upwardly into a downwardly opening fold in the holder disposed next above said holder strip, a plurality of folded record sheets mounted in said holders and having the distance from the upper edge of the record sheet to the lower fold in the sheet substantially equal to the distance between the lower fold of the Z shaped holder and the upper fold of the next upper holder, the record sheets extending laterally beyond the ends of the holders, and means connecting the rear surfaces of the laterally projecting portions of the record sheets together.

11. In combination, filing apparatus comprising a backing sheet, a plurality of holders secured thereto in overlapping relation, each holder consisting of a Z shaped strip, one end or leg of the strip being secured to the backing sheet, each holder strip having a portion extending upwardly into a downwardly opening fold in the holder disposed next above said holder strip, a plurality of folded record sheets mounted in said holders and having the distance from the upper edge of the record sheet to the lower fold in the sheet substantially equal to the distance between the lower fold of the Z shaped holder and the upper fold of the next upper holder, the record sheets extending laterally beyond the ends of the holders, the connected sheets being removable from the holders by a downward pull on the sheets.

JOSEPH A. SWEENEY.